United States Patent
Abiru et al.

(10) Patent No.: US 8,013,931 B2
(45) Date of Patent: Sep. 6, 2011

(54) SOLID-STATE IMAGING DEVICE AND IMAGE CAPTURE APPARATUS WITH ANTI-BLOOMING PRE-SHUTTER OPERATION

(75) Inventors: Takahiro Abiru, Kanagawa (JP); Ryoji Suzuki, Kanagawa (JP); Eiji Makino, Kanagawa (JP); Takayuki Usui, Fukuoka (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 12/026,596

(22) Filed: Feb. 6, 2008

(65) Prior Publication Data
US 2008/0192133 A1      Aug. 14, 2008

(30) Foreign Application Priority Data
Feb. 8, 2007   (JP) .................................. 2007-028633

(51) Int. Cl.
*H04N 5/235*   (2006.01)
*H04N 5/228*   (2006.01)

(52) U.S. Cl. .................................. 348/362; 348/208.12

(58) Field of Classification Search ............. 348/208.12, 348/241, 243, 248
See application file for complete search history.

(56) References Cited

U.S. PATENT DOCUMENTS

| | | | | |
|---|---|---|---|---|
| 2003/0090582 | A1* | 5/2003 | Shimokawa | 348/297 |
| 2003/0174236 | A1* | 9/2003 | Sakaguchi | 348/362 |
| 2006/0262209 | A1* | 11/2006 | Kishi | 348/297 |
| 2007/0166023 | A1* | 7/2007 | Murata | 396/159 |

FOREIGN PATENT DOCUMENTS

JP   2001-045383   2/2001

* cited by examiner

*Primary Examiner* — Hung Lam
(74) *Attorney, Agent, or Firm* — SNR Denton US LLP

(57) ABSTRACT

There is provided a solid-state imaging device having a pixel array section in which pixels including photoelectric conversion elements are arranged in a matrix form, and sweeping out unnecessary charges by setting a predetermined number, two or more, of adjacent rows or a predetermined number, two or more, of adjacent columns, in the pixel array section, to a single group, and by applying a shutter pulse in units of groups before storing signal charges, and sequentially reading the signal charges in the units of groups. In the solid-state imaging device, a pre-shutter pulse is applied to pixels belonging to at least a single row or a single column within a succeeding group and adjacent to a preceding group, prior to the shutter pulse, before a reading timing for the preceding group, to sweep out unnecessary charges stored in the pixels.

5 Claims, 5 Drawing Sheets

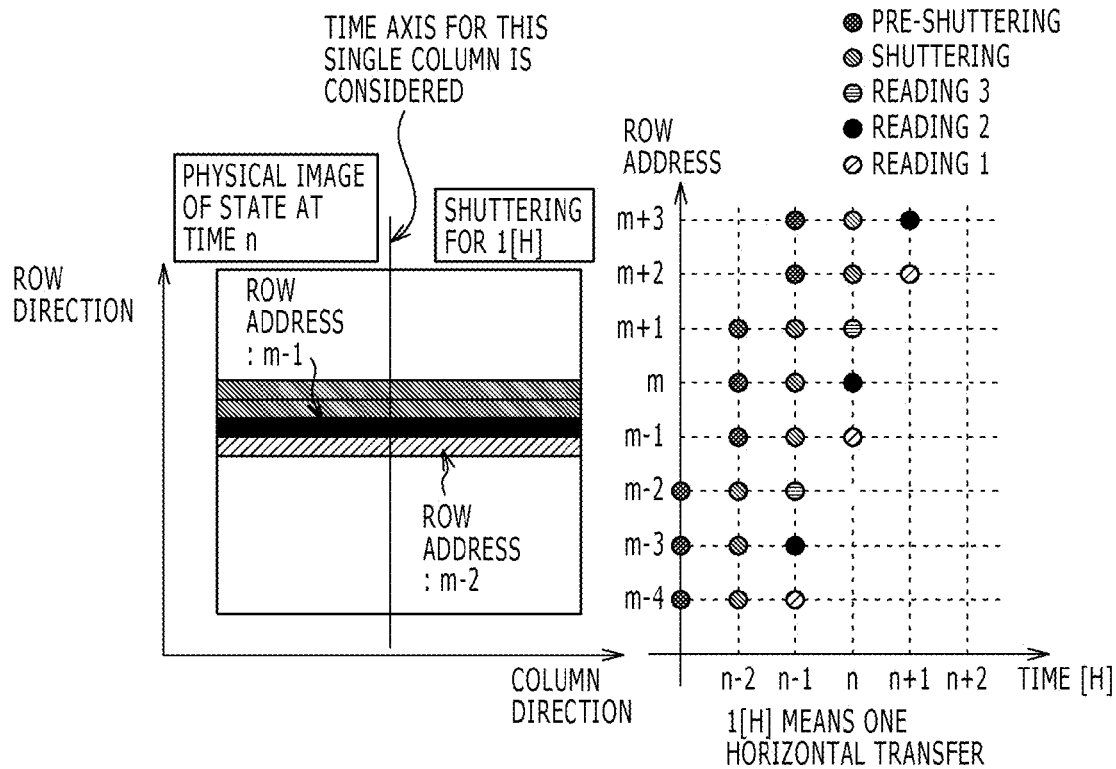
FIG. 3A
FIG. 3B
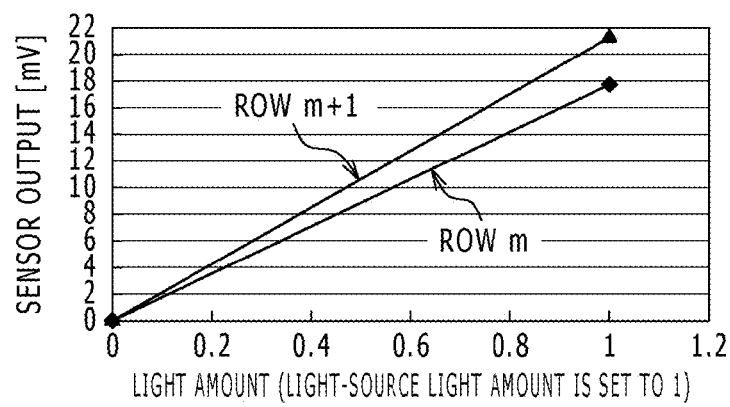
FIG. 4A
WITHOUT PRE-SHUTTERING
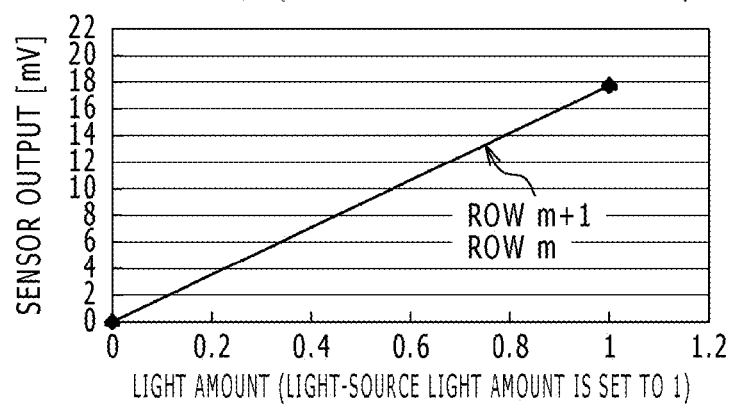
FIG. 4B
WITH PRE-SHUTTERING

SOLID-STATE IMAGING DEVICE AND IMAGE CAPTURE APPARATUS WITH ANTI-BLOOMING PRE-SHUTTER OPERATION

BACKGROUND OF THE INVENTION

1. Field of the Invention

The present invention relates to a solid-state imaging device and an image capture apparatus. More particularly, the invention is directed to a solid-state imaging device and an image capture apparatus which, by setting a predetermined number, two or more, of rows or a predetermined number, two or more, of columns to a single group, sequentially read signal charges for each group.

2. Description of Related Art

In X-Y addressable solid-state imaging devices typically represented by CMOS (Complementary Metal Oxide Semiconductor) image sensors, pixels can be selected in units of rows, columns, or pixels, from a pixel array section in which pixels including photoelectric conversion elements are arranged two-dimensionally in a matrix form, so that by specifying an arbitrary area in the pixel array section, pixel information in the arbitrary area can be partially cut out and read. See Japanese Patent Application Publication No. JP 2001-45383 (Patent Document 1), for example.

FIG. 5 is a schematic diagram for explaining a related-art CMOS image sensor, and FIG. 6 is a schematic diagram for explaining an example of a pixel circuit configuration for a certain pixel thereof. The CMOS image sensor herein shown includes a pixel array section 102 having pixels 101 including photoelectric conversion elements arranged two-dimensionally in a matrix form, a vertical scanning circuit 103, a column circuit (signal processing circuit) 104, a horizontal scanning circuit 105, a horizontal signal line 106, an output circuit 107, a timing generator (TG) 108 and so on. The pixel array section also has vertical signal lines 109, one being provided for each vertical pixel column.

Each pixel 101 forms a pixel circuit which has, in addition to the photoelectric conversion element, e.g., a photodiode 110, four transistors, e.g., a transfer transistor 111, a reset transistor 112, an amplifying transistor 113, and a selecting transistor 114. As these transistors, e.g., n-channel MOS transistors are used.

The transfer transistor 111 transfers a signal charge (an electron, here) which is photoelectrically converted by the photodiode 110 and stored at the transfer transistor 111, to a floating diffusion (FD) section 115 when a gate transfer pulse TRG is applied thereto. The reset transistor 112, connected between the FD section 115 and a power supply line for a power supply voltage VDD, resets a potential of the FD section 115 when a reset pulse RST is applied to its gate prior to the transfer of the signal charge from the photodiode 110.

The amplifying transistor 113 outputs a potential of the FD section 115 after the reset by the reset transistor 112 as a reset level, and also a potential of the FD section 115 after the transfer by the transfer transistor 111 as a signal level. The selecting transistor 114 selects the pixel 101 when a selection pulse SEL is applied to its gate, and outputs the reset level and the signal level supplied sequentially from the amplifying transistor 113, to a corresponding vertical signal line 109.

Here, a shutter operation of sweeping out unnecessary charges stored in the photodiodes of pixels before the storing of signal charges is started is performed by applying a transfer pulse TRG to the gate of the transfer transistor 111 and a reset pulse RST to the gate of the reset transistor 112 simultaneously.

Electronic shutter systems for image sensors include, mainly, a global shutter system and a rolling shutter system. The global shutter system performs a shutter operation on all pixels simultaneously, whereas, as shown in FIGS. 7A and 7B, the rolling shutter system temporally shifts areas for performing shutter operations from one area to another. It is noted that FIG. 7B shows shutter operation timings with a horizontal axis indicating a time [H] (1H: one horizontal transfer period) and a vertical axis indicating a row address, and that FIG. 7A represents a state at a time n[H] as a physical image. In addition, CMOS type image sensors mainly employ the rolling shutter system.

FIG. 11 of the above-mentioned Patent Document 1 shows the related-art CMOS image sensor capable of partially cutting out and reading pixel information in an arbitrary area in the pixel array section.

SUMMARY OF THE INVENTION

By the way, it is generally known that, when light incident onto the image sensor is extremely intense, a phenomenon called blooming occurs due to excessively produced signal charges overflowing and leaking from pixels into adjacent pixels. In an image sensor that reads a predetermined number, two or more, of rows or columns simultaneously, when the above-mentioned rolling shutter system is adopted, an offset difference caused by blooming occurs. It is noted that the term "simultaneously" herein used does not mean temporal simultaneousness in the strict sense of the word, but means simultaneousness in terms of rows or columns read within the same horizontal transfer period.

A mechanism will be described by which an offset difference caused by blooming occurs. Examples are given here as a case (A) where two rows are read simultaneously within a signal charge storing period set to one horizontal transfer period, and a case (B) where two rows are read simultaneously within a signal charge storing period set to two horizontal transfer periods.

A: case where two rows are read simultaneously within a signal charge storing period set to one horizontal transfer period FIG. 8B shows shutter operation timings with a horizontal axis indicating a time [H] and a vertical axis indicating a row address, and FIG. 8A represents a state at a time n[H] as a physical image. Here, if attention is paid to the state at the time n[H], first, at this time, a row (m−2) and a row (m−1) are read, and a shutter operation is performed on a row m and a row (m+1) to be read next. At this time, signal charges have already been read from the rows below the row m, so that there is no charge in the row (m−1). Also, the shutter operation has been performed on the row m and the row (m+1), so that there is no charge in the row m and the row (m+1) as well.

Meanwhile, a shutter operation is not performed yet on a row (m+2), so that as many charges as ("one frame"–"2H") remain stored. Accordingly, if there is such a light amount as to cause blooming with as many charges as ("one frame"–"2H"), the row m is free from a blooming from the vertically adjacent rows, but the row (m+1) undergoes a blooming from the row (m+2), so that an offset proportional to an amount of the blooming remains in the row (m+1) until the row (m+1) is read at a time (n+1)[H]. This results in an output difference between the row m and the row (m+1). It is noted that even if a light amount is so large as to cause a blooming with as many charges as stored within 1[H], the row m has a blooming amount equal to as many charges as stored within 1[H], whereas the row (m+1) has a blooming amount equal to as many charges as ("one frame"–"2H"), so that an offset difference also occurs, and hence appears as an output difference.

B: case where two rows are read simultaneously within a signal charge storing period set to two horizontal transfer periods FIG. 9B shows shutter operation timings with a horizontal axis indicating a time [H] and a vertical axis indicating a row address, and FIG. 9A represents a state at a time n[H] as a physical image. Here, if attention is paid to a state at a time (n−1)[H], a shutter operation is performed on a row (m−1) below a row m at a time which is 1[H] before, so that only as many charges as stored within 1[H] are stored. A shutter operation is already performed on a row (m+1) above the row m, so that there is no charge in the row (m+1). Meanwhile, a shutter operation is not performed yet on a row (m+2) above the row (m+1), so that as many charges as ("one frame"–"2H") are stored in the row (m+1), whereas a shutter operation has been performed on the row m below the row (m+1), so that there is no charge in the row m. Accordingly, the row m and the row (m+1) have different blooming amounts from their adjacent rows, respectively. Hence, offset differences occur, which result in output differences.

Japanese Patent Application Publication No. JP 2006-310932 proposes an anti-blooming measure in which a shutter operation is performed on rows not to be read in order to avoid blooming from the rows not to be read. However, no consideration has been given to blooming from a row to be read to another row to be read. Also, there have been many anti-blooming techniques in which a floating diffusion section is continuously reset to a power supply or the like, and charges having leaked into the floating diffusion section are discharged to the power supply or the like to reduce blooming to adjacent pixels. In these techniques, however, it is likely that the blooming will not be completely eliminated, and thus will remain.

In addition, when blooming occurs, the above-mentioned offset differences due to blooming occur in the rolling shutter system. When a signal level is low, e.g., during high-speed shuttering with a particularly large light amount, the influence of offsets caused by blooming is visibly recognized, so that a phenomenon may possibly be experienced in which sensor output ratios between rows largely differ from those during low-speed shuttering. Under such a situation, flickers occur in an actual image due to the sensor output ratios between rows being largely different when high-speed shuttering is performed.

Furthermore, Japanese Patent Application Publication No. JP 2004-111590 proposes still another anti-blooming technique of adding a switch for resetting the photodiode of a pixel during non-storing period. The addition of the new switch for avoiding blooming is disadvantageous to the miniaturization of a pixel.

In view of the above circumstances, it is desirable to provide a solid-state imaging device and an image capture apparatus capable of avoiding offsets due to blooming, without modifying a pixel circuit structure.

In one embodiment, the present invention provides a solid-state imaging device which has a pixel array section in which pixels including photoelectric conversion elements are arranged in a matrix form. The solid-state image device sweeps out unnecessary charges by setting a predetermined number, two or more, of adjacent rows or a predetermined number, two or more, of adjacent columns, in the pixel array section, to a single group, and by applying a shutter pulse in units of groups before storing signal charges, and sequentially reads the signal charges in the units of groups. A pre-shutter pulse is applied to pixels belonging to at least a single row or a single column within a succeeding group and adjacent to a preceding group, prior to the shutter pulse, before a reading timing for the preceding group, to sweep out unnecessary charges stored in the pixels.

In another embodiment, the present invention provides an image capture apparatus which includes a solid-state imaging device and an optical system. The solid-state imaging device has a pixel array section in which pixels including photoelectric conversion elements are arranged in a matrix form, sweeps out unnecessary charges by setting a predetermined number, two or more, of adjacent rows or a predetermined number, two or more, of adjacent columns, in the pixel array section, to a single group, and by applying a shutter pulse in units of groups before storing signal charges, and sequentially reads the signal charges in the units of groups. The optical system forms an image of image light from an object on an image capture plane of the solid-state imaging device. A pre-shutter pulse is applied to pixels belonging to at least a single row or a single column within a succeeding group and adjacent to a preceding group, prior to the shutter pulse, before a reading timing for the preceding group, to sweep out unnecessary charges stored in the pixels.

Here, by applying a pre-shutter pulse to pixels belonging to at least a single row or a single column within a succeeding group and adjacent to a preceding group, prior to a shutter pulse, before a reading timing for the preceding group to sweep out unnecessary charges stored in the pixels, it is possible to eliminate blooming or to make blooming amounts from vertically or horizontally adjacent pixels substantially equal for pixels belonging to a group from which signal charges are stored.

These and other features and aspects of the invention are set forth in detail below with reference to the accompanying drawings in the following detailed description of the embodiments.

BRIEF DESCRIPTION OF THE DRAWINGS

FIGS. 3A and 3B are diagrams for explaining still another example of the solid-state imaging device according to the embodiment of the present invention;

FIGS. 4A and 4B are graphs showing experimental results about an offset difference due to blooming during actual storing within 1[H] and the effect of a pre-shutter operation;

DETAILED DESCRIPTION OF THE EMBODIMENT

An embodiment of the present invention will be described below with reference to the drawings for an understanding of the present invention. It is noted that a pixel circuit structure of a solid-state imaging device according to an embodiment of the present invention is similar to that of the related-art solid-state imaging device.

Figure 1A:
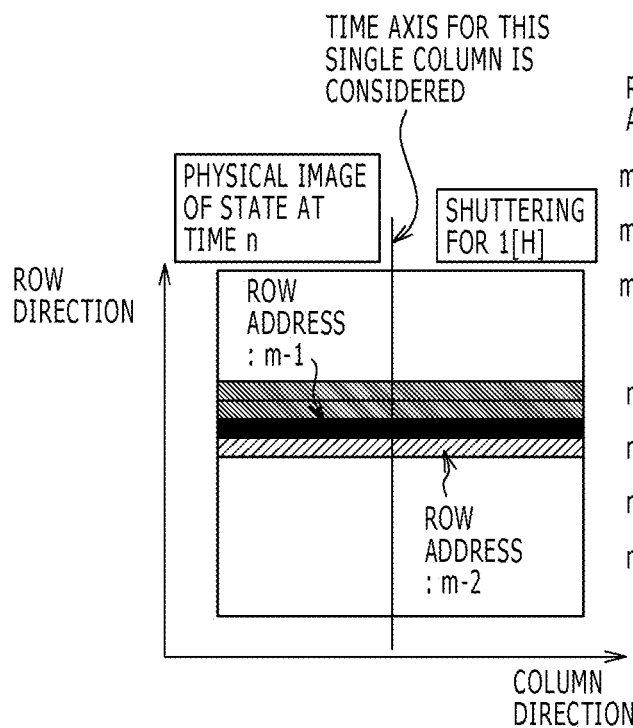
FIGS. 1A and 1B are diagrams for explaining an example of a solid-state imaging device according to an embodiment of the present invention.
Figure 1B:
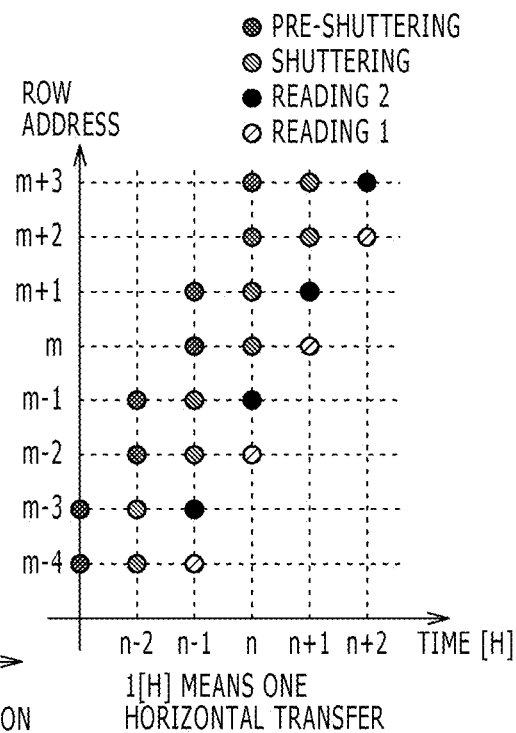

FIGS. 1A and 1B are diagrams for explaining a first example of the solid-state imaging device according to the embodiment of the present invention, in which FIG. 1B shows shutter operation timings with a horizontal axis indicating a time [H] and a vertical axis indicating a row address, and FIG. 1A represents a state at a time n[H] as a physical image. In the solid-state imaging device according to the first embodiment, a signal charge storing period is set to one horizontal period, and that the solid-state imaging device is of a type which reads two rows simultaneously (a type in which two adjacent rows are set to a single group).

Here, in the first example of the solid-state imaging device, in addition to a shutter operation to be performed at a time which is 1[H] before the reading of signal charges, a pre-shutter operation is performed at a time which is 1[H] before the shutter operation. Specifically, for a row (m−3) and a row (m−4) from which signal charges are read at a time (n−1)[H], a pre-shutter operation is performed at a time (n−3)[H] and a shutter operation is performed at a time (n−2)[H]. Also, for a row (m−1) and a row (m−2) from which signal charges are read at the time n[H], a pre-shutter operation is performed at the time (n−2)[H] and a shutter operation is performed at the time (n−1)[H]. Furthermore, for a row (m+1) and a row m from which signal charges are read at a time (n+1)[H], a pre-shutter operation is performed at the time (n−1)[H] and a shutter operation is performed at the time n[H]. Furthermore, for a row (m+3) and a row (m+2) from which signal charges are read at a time (n+2)[H], a pre-shutter operation is performed at the time n[H] and a shutter operation is performed at the time (n+1)[H].

In the first example of the solid-state imaging device, if attention is paid to the time n[H], the row (m−1) below the row m has been read, so that there is no charge. The shutter operation has been performed on the row (m+1) above the row m, so that is the row m has no charge. Also, the shutter operations have been performed on both the rows (m+2) and m above and below the row (m+1), so that these rows have no charge. As a result, blooming can be avoided and thus no offset occurs, so that there will be no output difference attributable to an offset difference due to blooming.

It is noted that in a case where charges are saturated within 1[H] to produce so large a light amount as to cause blooming, an offset occurs in the row m due to a blooming equal to as many charges as stored within 1[H] from the row (m−1), and an offset occurs in the row (m+1) due to a blooming equal to as many charges as stored within 1[H] from the row (m+2). However, in this case, these offsets are equal in amount, thereby producing no offset difference, thereby introducing no output difference.

While the pre-shutter operation is performed on all the rows in the present embodiment, it is enough for avoiding blooming causing offset differences to perform a pre-shutter operation only on the row (m+2), and a pre-shutter operation is not necessarily needed for a row (m+3), as long as attention is paid to the time n[H]. However, if the number of shutter operations differs from one row to another, a reset capacity difference between rows and an applied load difference between rows in photodiodes may usually lead to an offset for each row, so that it is preferable to perform the same number of shutter operations on each row. In addition, while a pre-shutter operation is performed only once before a shutter operation in the present embodiment, a plurality of pre-shutter operations may be performed as long as no problem arises in terms of characteristics.

Figure 2A:
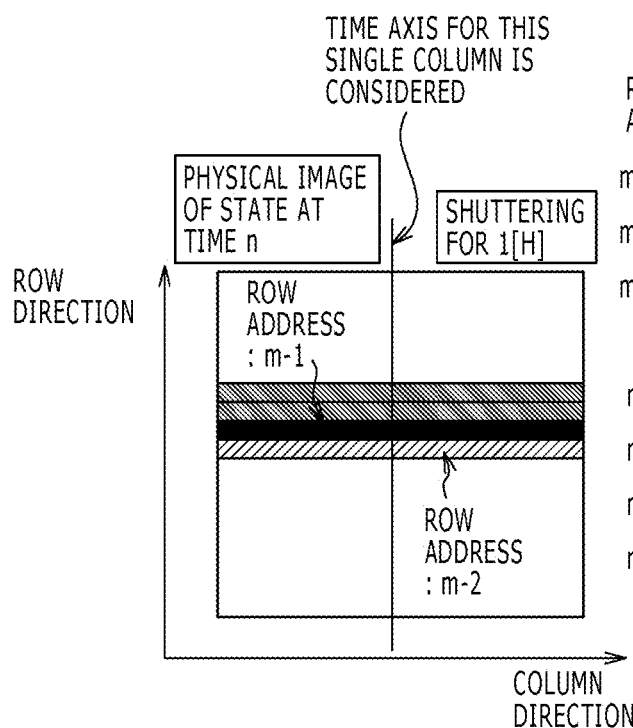
FIGS. 2A and 2B are diagrams for explaining another example of the solid-state imaging device according to the embodiment of the present invention.
Figure 2B:
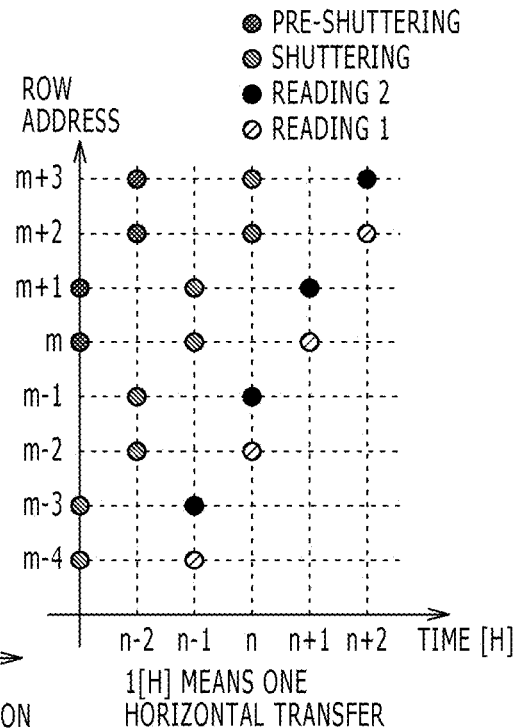
Figure 5:
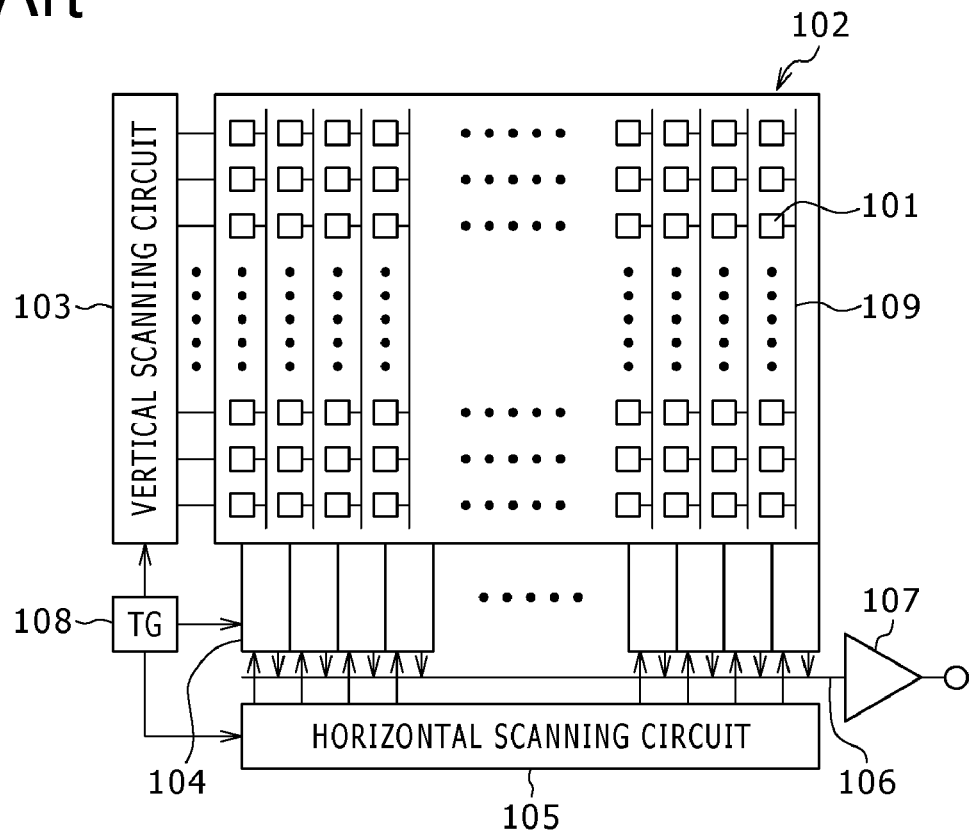
FIG. 5 is a schematic diagram for explaining a related-art CMOS image sensor.
Figure 6:
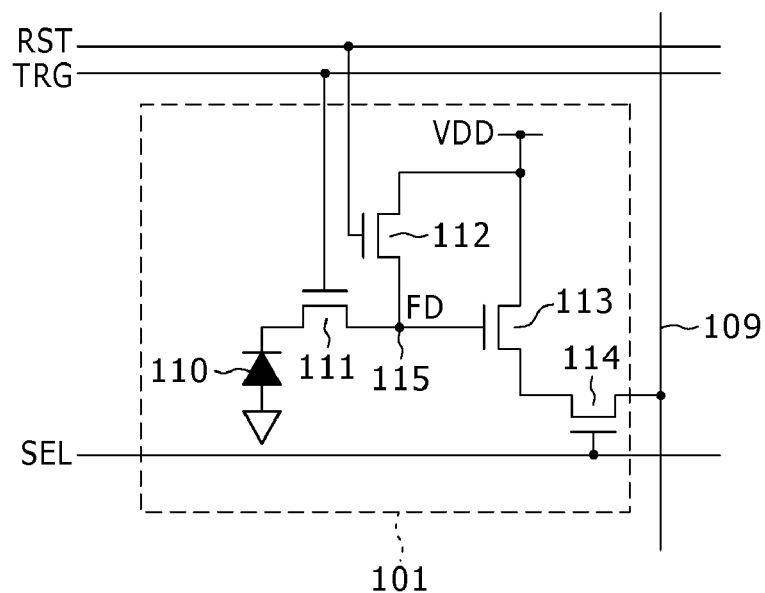
FIG. 6 is a schematic diagram for explaining an example of a pixel circuit configuration for a certain pixel.
Figure 7A:
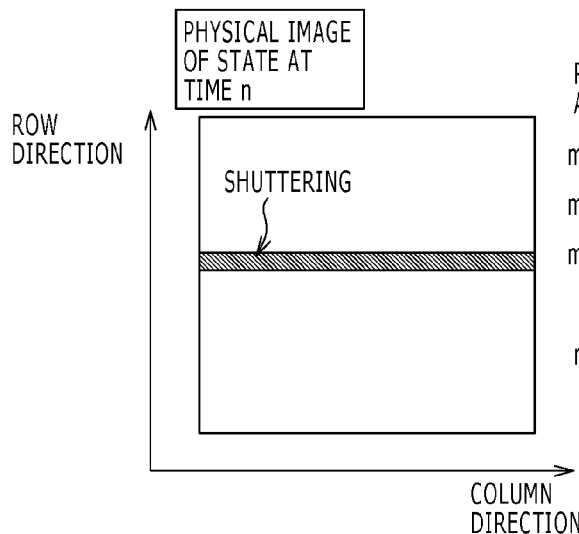
FIGS. 7A and 7B are diagrams for explaining a rolling shutter system.
Figure 7B:
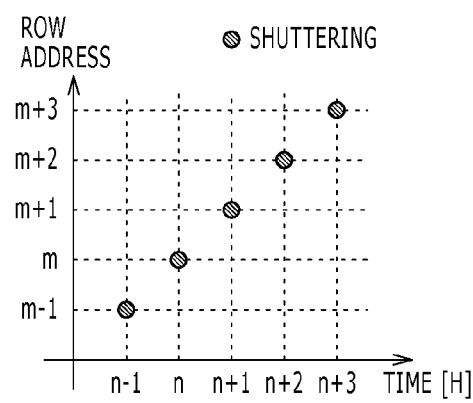
Figure 8A:
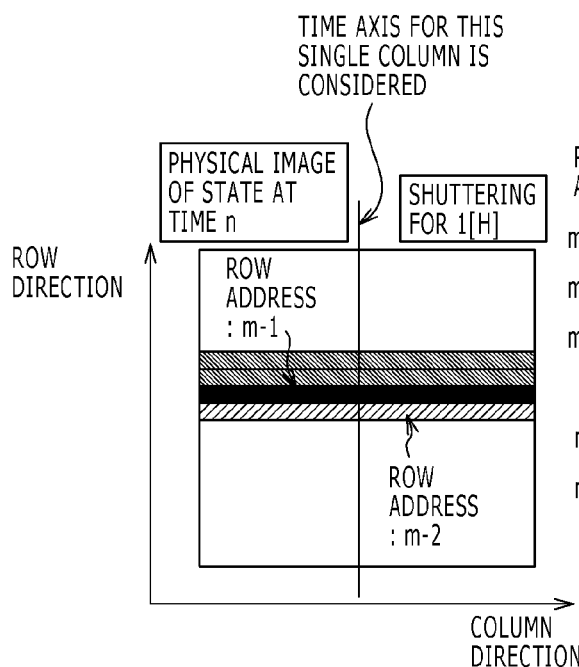
FIGS. 8A and 8B are first diagrams for explaining a mechanism by which an offset difference due to blooming occurs.
Figure 8B:
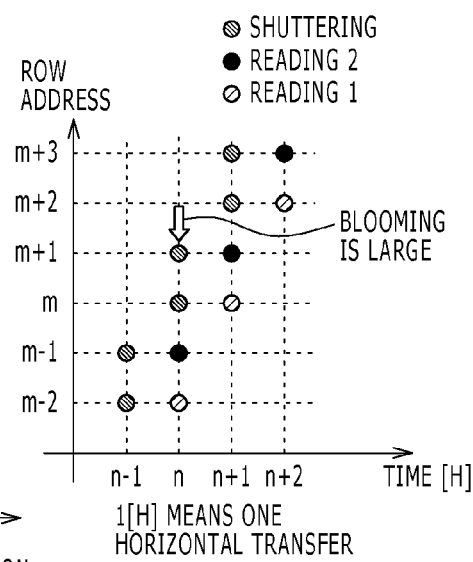
Figure 9A:
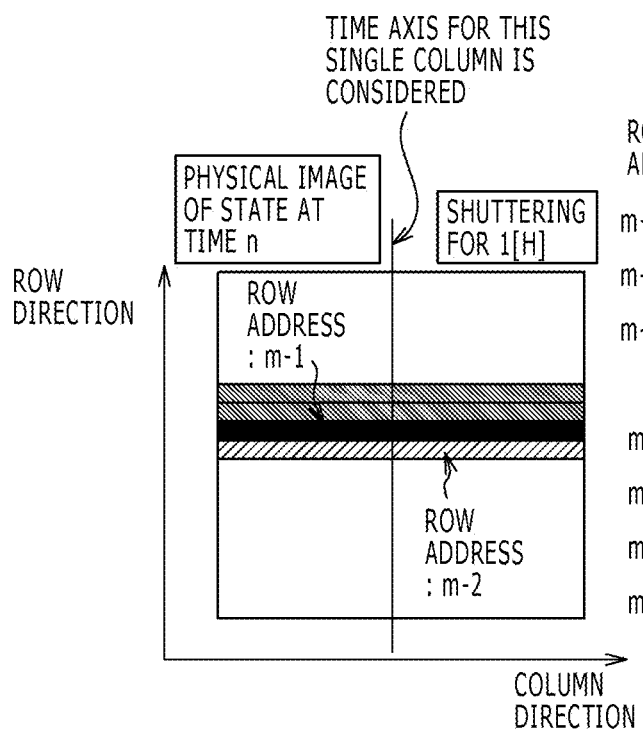
FIGS. 9A and 9B are second diagrams for explaining a mechanism by which offset differences due to blooming occur.
Figure 9B:
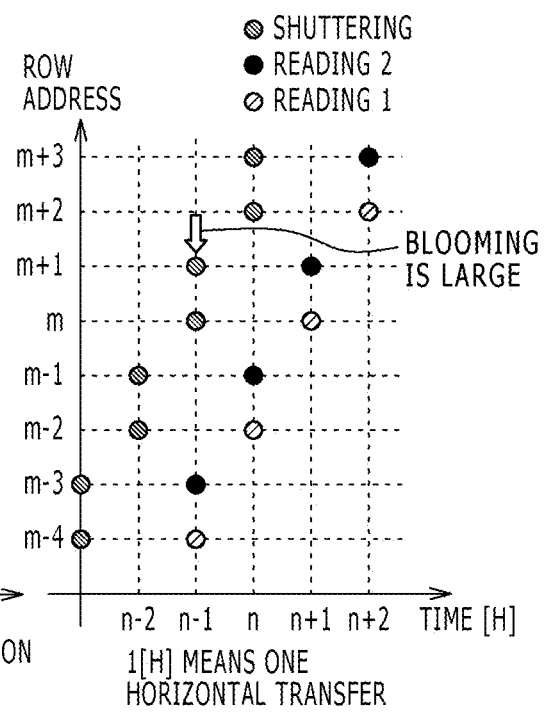

FIGS. 2A and 2B are diagrams for explaining a second example of the solid-state imaging device according to the embodiment of the present invention, in which FIG. 2B shows shutter operation timings with a horizontal axis indicating a time [H] and a vertical axis indicating a row address, and FIG. 2A represents a state at a time n[H] as a physical image. The second example of the solid-state imaging device includes the one in which a signal charge storing period is set to two horizontal periods, being of a type which reads two rows simultaneously (a type in which two adjacent rows are set to a single group).

In the second example of the solid-state imaging device, in addition to a shutter operation to be performed at a time which is 2[H] before the reading of signal charges, a pre-shutter operation is performed at a time which is 2[H] before the shutter operation. Specifically, for a row (m−3) and a row (m−4) from which signal charges are read at a time (n−1)[H], a pre-shutter operation is performed at a time (n−5)[H] (not shown) and a shutter operation is performed at a time (n−3)[H]. Also, for a row (m−1) and a row (m−2) from which signal charges are read at the time n[H], a pre-shutter operation is performed at a time (n−4)[H] (not shown) and a shutter operation is performed at a time (n−2)[H]. Furthermore, for a row (m+1) and a row m from which signal charges are read at a time (n+1)[H], a pre-shutter operation is performed at the time (n−3)[H] and a shutter operation is performed at a time (n−1)[H]. Furthermore, for a row (m+3) and a row (m+2) from which signal charges are read at a time (n+2)[H], a pre-shutter operation is performed at the time (n−2)[H] and a shutter operation is performed at the time n[H].

In the second example of the solid-state imaging device, similarly to the above-mentioned first example of the solid-state imaging device, blooming from rows which are above and below a row of interest is eliminated, or even if blooming does occur, offset amounts are substantially equal, thereby producing no offset difference, and an output difference is not introduced.

FIGS. 3A and 3B are diagrams for explaining a third example of the solid-state imaging device according to the embodiment of the present invention, in which FIG. 3B shows shutter operation timings with a horizontal axis indicating a time [H] and a vertical axis indicating a row address, and FIG. 3A represents a state at a time n[H] as a physical image. The third example of the solid-state imaging device includes the one in which a signal charge storing period is set to one horizontal period, being of a type which reads three rows simultaneously (a type in which three adjacent rows are set to a single group).

Here, in the third example of the solid-state imaging device, in addition to a shutter operation to be performed at a time which is 1[H] before the reading of signal charges, a pre-shutter operation is performed at a time which is 1[H] before the shutter operation. Specifically, for a row (m−2), a row (m−3), and a row (m−4) from which signal charges are read at a time (n−1)[H], a pre-shutter operation is performed at a time (n−3)[H] and a shutter operation is performed at a time (n−2)[H]. Also, for a row (m+1), a row m, and a row (m−1) from which signal charges are read at the time n[H], a pre-shutter operation is performed at the time (n−2)[H] and a shutter operation is performed at the time (n−1)[H]. Furthermore, for a row (m+4) (not shown), a row (m+3), and a row (m+2) from which signal charges are read at a time (n+1)[H], a pre-shutter operation is performed at the time (n−1)[H] and a shutter operation is performed at the time n[H].

In the third example of the solid-state imaging device, similarly to the above-mentioned first and second examples of the solid-state imaging device, blooming from rows which are above and below a row of interest is eliminated, or even if blooming does occur, offset amounts are substantially equal, thereby producing no offset difference, and an output difference is not introduced.

FIGS. 4A and 4B show experimental results about an offset difference due to blooming during storing within 1[H] and the effect of a pre-shutter operation. These experimental results shown in FIGS. 4A and 4B are obtained from a solid-state imaging device of a type which reads two rows simultaneously within a signal charge storing period set to one horizontal period, and indicate how sensor outputs from rows m and (m+1) during storing within i[H] are dependent on the light amount.

As is apparent also from FIGS. 4A and 4B, the influence of blooming increases with increasing amount of light if no pre-shutter operation is performed. Hence, it is understood that an offset difference between the row m and the row (m+1) increases. Meanwhile, if a pre-shutter operation is performed, even when the light amount is increased, the influence of blooming can be avoided by the pre-shutter operation, so that no offset difference occurs.

In the above-mentioned solid-state imaging device according to the embodiment of the present invention, it is possible to avoid offset differences due to blooming between rows without modification of their pixel circuit configurations.

In addition, performing of a pre-shutter operation amounts to performing of two or more shutter operations (a traditional shutter operation plus a pre-shutter operation), so that it is also expected to reduce improper reset of the photodiodes of pixels caused by defective reset operations.

It is noted that the term "improper reset of a photodiode" means a phenomenon in which the photodiode is not reset completely during a shutter operation, so that a charge is left therein, and the charge appears as an offset during a next reading operation, thereby producing an improper pixel signal. If a pre-shutter operation is performed, even a pixel whose photodiode is improperly reset because its transistors have low driving capacities due to variations in their manufacture, could maintain such a reset level as not to cause a problem in its characteristics, so that an improvement in yield can be expected.

In the above-mentioned solid-state imaging device according to the embodiment of the present invention, the examples in which a plurality of rows are set as a single group have been described. However, a plurality of columns may alternatively be set as a single group.

In the solid-state imaging device and the image capture apparatus according to the embodiments of the present invention, it is possible to eliminate blooming or to make blooming amounts from vertically or horizontally adjacent pixels substantially equal for pixels belonging to a group from which signal charges are stored. Accordingly, offsets due to blooming can be avoided.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2007-028633 filed in the Japanese Patent Office on Feb. 8, 2007, the entire contents of which being incorporated herein by reference.

What is claimed is:

1. A solid-state imaging device, comprising:
a pixel array section in which pixels are arranged in a matrix form with rows and columns, each pixel including a photoelectric conversion element that converts light into electric charges, each pixel including a charge storage element to which the charges are transferred from the photoelectric conversion element and in which the charges are stored prior to read out of the pixel,
wherein,
the rows or columns are grouped into groups, each group having a predetermined number of two or more adjacent rows or columns
for each group selected for readout of its pixels, unnecessary charges are swept out by applying a shutter pulse operation to the group before charges are transferred from the photoelectric conversion elements to the charge storage elements, and
a pre-shutter pulse is applied to pixels belonging to at least one row or one column within a succeeding group adjacent to the group selected for readout of its pixels, prior to the shutter pulse for the group selected for readout of its pixels, and before a reading timing for the group selected for readout of its pixels, to sweep out unnecessary charges stored in the pixels.

2. The solid-state imaging device according to claim 1, wherein the pre-shutter pulse is applied to all pixels within the succeeding group, before the reading timing for the group selected for readout of its pixels.

3. An image capture apparatus including:
a solid-state imaging device having a pixel array section in which(a) pixels including photoelectric conversion elements are arranged in a matrix form with rows and columns, (b) each pixel includes a photoelectric conversion element that converts light into electric charges, (c) each pixel includes a charge storage element to which the charges are transferred from the photoelectric conversion element and in which the charges are stored prior to read out of the pixel, (d) the rows or columns are grouped into groups, each group having a predetermined number of two or more and(e) applying a shutter pulse to each group before storing of signal charges occurs, and sequentially reading the signal charges the units out of the groups; and
an optical system for forming an image of image light from an object on an image capture plane of the solid-state imaging device,
wherein,
when selected for readout of its pixels, each group is to perform an image signal capture operation that includes first and second shutter operations, followed by a readout operation, with transfer of charges from the photo conversion elements to the charge storage elements occurring after the second shutter operation,
when selected for readout of its pixels, each pixel is subjected to first and second successive shutter operations prior to transfer charges from the photoelectric conversion elements to the charge storage elements, and
after the first shutter operation, but simultaneously with or prior to the second shutter operation, the pixels of at least the adjacent row or column of the group to be subjected next to a readout of its pixels are subjected to their own first shutter operation.

4. A solid-state imaging device, comprising:
a pixel array section in which pixels are arranged in a matrix form with rows and columns, each pixel including a photoelectric conversion element that converts light into electric charges, each pixel including a charge storage element to which the charges are transferred from the photoelectric conversion element and in which the charges are stored prior to read out of the pixel, wherein,
  the rows or columns are grouped into groups, each group having a predetermined number of two or more adjacent rows or columns,
  when selected for readout of its pixels, each group is to perform an image signal capture operation that includes first and second shutter operations, followed by a readout operation, with transfer of charges from the photo conversion elements to the charge storage elements occurring after the second shutter operation,
  when selected for readout of its pixels, each pixel is subjected to first and second successive shutter operations prior to transfer charges from the photoelectric conversion elements to the charge storage elements, and
  after the first shutter operation, but simultaneously with or prior to the second shutter operation, the pixels of at least the adjacent row or column of the group to be subjected next to a readout of its pixels are subjected to their own first shutter operation.

5. The solid-state imaging device of claim 4, wherein all of the rows or columns of the adjacent row or column of the group to be subjected next to a readout operation of its pixels are subjected to the their own first shutter operation.

* * * * *